(12) United States Patent
Yamamoto et al.

(10) Patent No.: US 6,332,572 B1
(45) Date of Patent: Dec. 25, 2001

(54) KEY CODE CORRELATION SECURITY

(75) Inventors: Keiji Yamamoto, Ann Arbor, MI (US); Noriyasu Onishi, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/303,686

(22) Filed: May 3, 1999

(30) Foreign Application Priority Data

May 6, 1998 (JP) .................................................. 10-123604

(51) Int. Cl.[7] ...................................................... G06K 5/00
(52) U.S. Cl. ........................................ 235/382; 235/382.5
(58) Field of Search ................................ 235/382, 382.5, 235/385, 375, 383, 384; 705/18

(56) References Cited

U.S. PATENT DOCUMENTS

| | | | |
|---|---|---|---|
| 4,931,664 | * | 6/1990 | Knoll ...................................... 307/10.3 |
| 4,980,680 | * | 12/1990 | Knoll et al. ...................... 340/825.31 |
| 5,038,023 | * | 8/1991 | Saliga ...................................... 235/385 |
| 5,461,386 | * | 10/1995 | Knelbelkamp ......................... 342/44 |
| 5,543,798 | * | 8/1996 | Schuermann ........................... 342/42 |
| 5,552,789 | * | 9/1996 | Schuermann ........................... 342/42 |
| 5,561,430 | * | 10/1996 | Knebelkamp ......................... 342/44 |
| 5,675,490 | * | 10/1997 | Bachhuber ..................... 364/424.037 |
| 5,742,236 | * | 4/1998 | Cremers et al. ................. 340/825.31 |
| 5,773,803 | | 6/1998 | Fukuta ................................. 235/375 |
| 5,796,329 | * | 8/1998 | Bachhuber ............................ 340/426 |
| 5,937,065 | * | 8/1999 | Simon et al. ............................. 380/9 |
| 6,043,752 | * | 3/2000 | Hisada et al. ................... 340/825.31 |
| 6,085,805 | * | 7/2000 | Bates ...................................... 141/94 |

FOREIGN PATENT DOCUMENTS

411150714-A * 9/1999 (JP) .

* cited by examiner

Primary Examiner—Karl D. Frech
(74) Attorney, Agent, or Firm—Pillsbury Winthrop L.L.P.

(57) ABSTRACT

A transponder type key security system having a plurality of authorized keys efficiently correlates a key code transmitted by a key-based transponder unit with codes stored in an interrogator unit while inhibiting reception interference by multiple signals transmitted by a plurality of key-based transponder units. The interrogator unit transmits a general request for key-based transponder units having pre-stored key codes allocated thereto to respond by giving their respective key codes. A transponder unit, upon receiving the request, transmits its key code to the interrogator unit. The interrogator unit compares a received key code with key codes previously stored to determine if the transponder unit responding is authorized or not. In the event that multiple transponder units respond to the request, the interrogator unit transmits a key-specific request so that only the targeted key-based transponder unit will respond. This prevents multiple transponder requests from interfering with one another. Usually only a single key is present and there is no need to transmit key-specific requests. Thus, the number of key code requests to be transmitted is reduced and a determination of whether a key is authorized or not can be carried out efficiently.

14 Claims, 5 Drawing Sheets

KEY CODE CORRELATION SECURITY

INCORPORATION BY REFERENCE

The disclosure of Japanese Patent Application No. HEI 10-123604 filed on May 6, 1998, including the specification, drawings and abstract, is incorporated herein by reference in its entirety.

BACKGROUND OF THE INVENTION

1. Field of Invention

The present invention relates to a key code security arrangement that determines whether a particular key is authorized. An interrogator unit sends a key code request to a key-based transponder unit. In response to the request, the key-based transponder unit transmits a signal including its pre-assigned key code. The interrogator unit then compares the key code transmitted by the transponder unit with key codes previously stored in the interrogator unit.

2. Description of Related Art

Because convention keys are easy to duplicate, there are various kinds of key code security arrangements used in motor vehicles. It is desirable to be able to easily determine whether a particular key inserted into an ignition switch key lock is an authorized key. Various kinds of immobilizer systems are known. Such systems prevent the motor vehicle from being operated if the key is not authorized. When an attempt is made to start an engine without using a correct key, an immobilizer system may, for example, prohibit the supply of fuel to the engine, prevent ignition or otherwise interfere with the operation of the motor vehicle.

In general, such systems rely on the use of two separate units. A vehicle-side unit is, essentially, an interrogator device that sends request signals to key-based transponder units. The vehicle-side interrogator unit includes an immobilizer coil that is wrapped around a key cylinder of the ignition system. The transponder is built into the ignition key. The interrogator unit transmits a signal constituting a request. This signal is transmitted via the immobilizer coil which functions as an antenna. The request signal is received by the key-based transponder. The request signal can be used to provide operating power to the transponder and, of course, carries the request itself. In response to the request, the transponder transmits a signal including a key code previously assigned to that key and stored in a memory of the transponder.

The interrogator unit receives the transmitted key code and compares it with a plurality of previously registered reference key codes stored in a memory associated with the interrogator unit. If there is a match indicating that the key responding is authorized, the vehicle-side device permits the vehicle to be operated. For many such systems, a plurality of keys are manufactured and authorized and it is intended that any of them can be used. The immobilizer system must, therefore, be able to cope with a plurality of key codes. According to Japanese Patent Publication Laid-Open No. HEI 9-88390, a plurality of key codes are registered in the vehicle-side device. Then, according to a predetermined priority sequence, there is an attempt to correlate a received key code with one authorized code after another. In this manner, the immobilizer system can cope with a plurality of key codes.

In some cases, a plurality of keys, such as on a key ring, may be in the vicinity of the key cylinder. This situation is depicted in FIG. 7. One of two keys on the key ring is inserted into the key cylinder. However the transponders of both keys are likely to respond to a request from the interrogator unit because both are in close proximity to the immobilizer coil. Accordingly, two transponders respond to a key code request from the vehicle-side device. These responses interfere with each other and confuse the vehicle-side interrogator device.

To prevent such interference, key-specific key code requests for each authorized key can be transmitted by the interrogator unit one by one in sequence. Each key-based transponder will only respond to its key-specific request. This avoids the interference problem due to simultaneous responses by a plurality of key-based transponders. However, if there are many authorized keys, this process of sending sequential key code requests and waiting for appropriate responses can be very time consuming. This process also consumes significant power. This situation is unacceptable. When a vehicle is stopped, the process of interrogation may be repeated many times.

SUMMARY OF THE INVENTION

The invention set forth herein overcomes the problem of interference by multiple authorized keys. It utilizes a more rational scheme for interrogating keys attempting to operate the vehicle. The scheme presented herein is efficient and can usually be carried out in a reasonable length of time.

The claimed arrangement includes a vehicle-side interrogator unit and a key-based transponder unit. The interrogator unit includes a transmitter for sending requests and a receiver for receiving key code signals from key-based transponder units. Each key-based transponder unit includes a memory storing a previously assigned key code that is specific to that key. This key code is transmitted in response to a request from the vehicle-side interrogator unit. After receiving a key code transmitted by a transponder unit, the interrogator unit reviews previously stored key codes in its associated memory to see if there is a match between the key code received and one of the codes previously stored. If there is a match, then the key transmitting the key code is considered to be authorized.

The interrogator unit includes a key code memory storing a plurality of key codes, a key code request changing means for differentiating key code requests for each of a plurality of key codes, and interference determination means for determining whether or not answer signals responding to a key code request interfere with one another. If the interference determination means has determined that there is interference, a key code request is individually changed by the key code request changing means, a request for an individual key code is formed and sent out, and then comparison is made between the key code answer by the transponder unit and the expected key code.

At first, a general key code request is made, rather than a key specific request. This is done because much of the time there will not be interference between two or more transponder units responding to such a general request. Only when it has been determined that there is interference between two or more answers will the interrogator formulate key-specific requests and try them one at a time, sequentially. Accordingly, time is not wasted when there is no interference among responses, and a general key code request suffices. This reduces the number of key code requests in most cases, allowing an answer to be obtained quickly and efficiently. If there is no interference by two or more answers to a general key code request, plurality key codes stored in memory of the interrogator unit can be compared with the answer according to a predetermined sequence. Thus, correlation can be carried out reliably with respect to a plurality of key codes.

Only in the case of interference is it necessary to formulate and transmit key-specific key code requests that are differentiated for each key code. Thus, normally, any key is able to respond quickly, and the time required to terminate a correlation process can be reduced.

BRIEF DESCRIPTION OF THE DRAWINGS

The foregoing and further objects, features and advantages of the present invention will become apparent from the following description of a preferred embodiment with reference to the accompanying drawings, wherein.

DETAILED DESCRIPTION OF THE INVENTION

The invention will now be described in detail with reference to the accompanying drawings.

Figure 1:
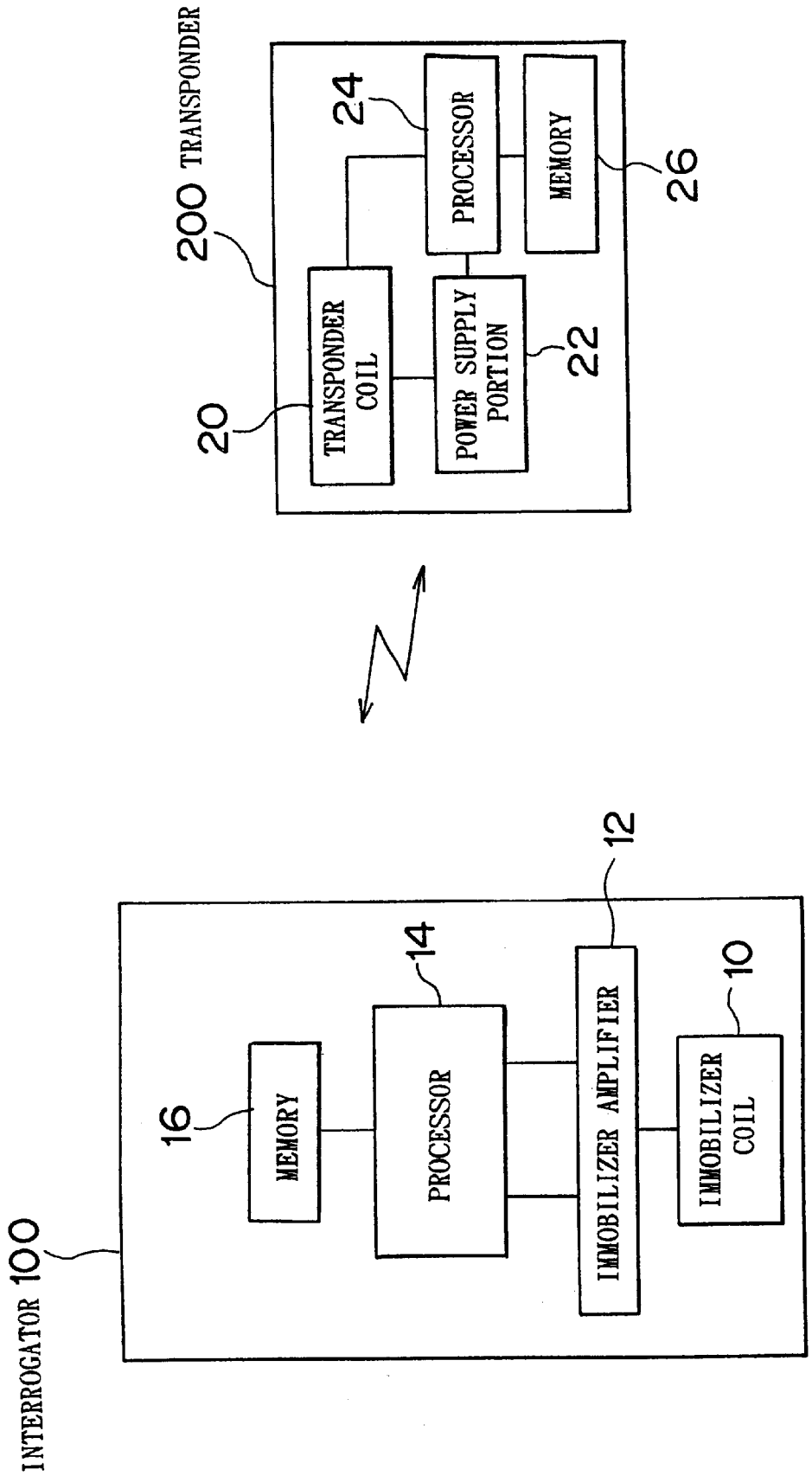
FIG. 1 is a block/schematic diagram of the invention.

FIG. 1 is a block/schematic diagram of the invention. The illustrated embodiment is for a motor vehicle. However, the concepts of the present invention are applicable to other key code security systems. In fact, the concepts can be applied to almost any lock and key arrangement. An interrogator 100 is positioned somewhere in a vehicle. In this case, the invention is part of an immobilizer system for preventing operation of the vehicle when access is attempted using an unauthorized key. Interrogator 100 includes an immobilizer coil 10 which serves as a transmitting and receiving antenna. Immobilizer coil 10 is formed so as to surround an ignition key cylinder and is connected to an immobilizer amplifier 12. The immobilizer amplifier 12 supplies a transmit signal to the immobilizer coil 10 when a key code request is to be sent by interrogator 100. Immobilizer amplifier 12 also receives an answer signal transmitted by transponder 200 and received by immobilizer coil 10.

Immobilizer amplifier 12 is connected to a processor 14. Processor 14 performs various signal processing functions including formulating key code request transmissions and interpreting answer signals that have been transmitted by a transponder 200. A memory 16, preferably an EEPROM (Electrical Erasable Programmable Read Only Memory), is coupled to processor 14. Memory 16 stores a plurality of key codes representing keys that are authorized. Processor 14 not only creates key code request signals and processes received answer signals, it also correlates received answer signals with the various key codes stored in memory 16.

A transponder 200, disposed in a key, has a transponder coil 20. Transponder 200 and interrogator 100 communicate using electromagnetic waves. They are not physically connected to each other. Signals are communicated bi-directionally between coils 10 and 20. A power supply 22 receives a signal generated in coil 20, responsive to a signal transmitted by coil 10. This signal can be a portion of a key request, or it can be a separately generated signal for the sole purpose of supplying power to the transponder. Power supply 22 rectifies this received signal and stores electrical energy therefrom for providing operating power to the other components of transponder 200. A processor 24, connected to transponder coil 20, receives key code request signals from coil 20 and drives coil 20 to transmit answer signals. A memory 26, preferably an EEPROM, is connected to processor 24 and stores one or more key codes (ID) allocated to that key. Processor 24 reads a key code from memory 26 in response to a key code request signal, and supplies a transmit answer signal to the transponder coil 20 based on the key code read from memory 26. The key code of a registered key coincides with one of the key codes stored in the memory 16 in interrogator 100.

Key code requests from interrogator 100 are classified into two types, that is, a general key code request that does not specify a communication partner and an individual key code request that specifies a particular transponder 200 as its communication partner. First, we describe the transmission of a general key code request.

Processor 14 generates a general key code request, which is supplied to immobilizer amplifier 12. Immobilizer amplifier 12 supplies a transmit signal corresponding to the request to immobilizer coil 10. The general key code request is transmitted by immobilizer coil 10. In the transponder 200, the processor 24 receives the general key code request via transponder coil 20. Transponder 200 reads out its own key code that is stored in memory 26, and returns the code as an answer to the key code request. This response is received by the immobilizer coil 10 and supplied to processor 14 through the immobilizer amplifier 12. Processor 14 sequentially compares received key codes with those stored in memory 16. If one of the received key codes coincides with one of the key codes stored in memory 16, the system permits the engine of the motor vehicle to be operated. Comparison is carried out in accordance with a predetermined priority sequence. In view of the frequency of usage of the key codes, the priority sequence may be changed. The response of the transponder 200 may include a password indicating a key code thereof, whereby the key code corresponding to the password received by the processor 14 is read out and subjected to comparison.

Next, we will describe the transmission of an individual key code request. The individual key code request is composed of a general key code request, to which a password that is preliminarily allocated to each key code (of each transponder 200) is added. As in the above-described case, the individual key code request is also transmitted from a the immobilizer coil 10 and received by coil 20 of transponder 200.

The transponder 200 determines whether or not its own password stored in memory 26 coincides with a password of the received individual key code request. Only when such a coincidence is confirmed, the transponder 200 returns a response including its key code. Different passwords are allocated to a plurality of keys (key codes). Thus, there is only one key that returns a response to the individual key code request having a certain password. Therefore, it is possible to prevent responses from a plurality of keys from interfering with one another.

According to what has been described above, the different passwords are allocated to a plurality of keys. The passwords may be different codes to each of vehicles or vehicle families. And the passwords may be combined the different codes to each of vehicles or vehicle families and the different codes to each of keys.

Figure 2:
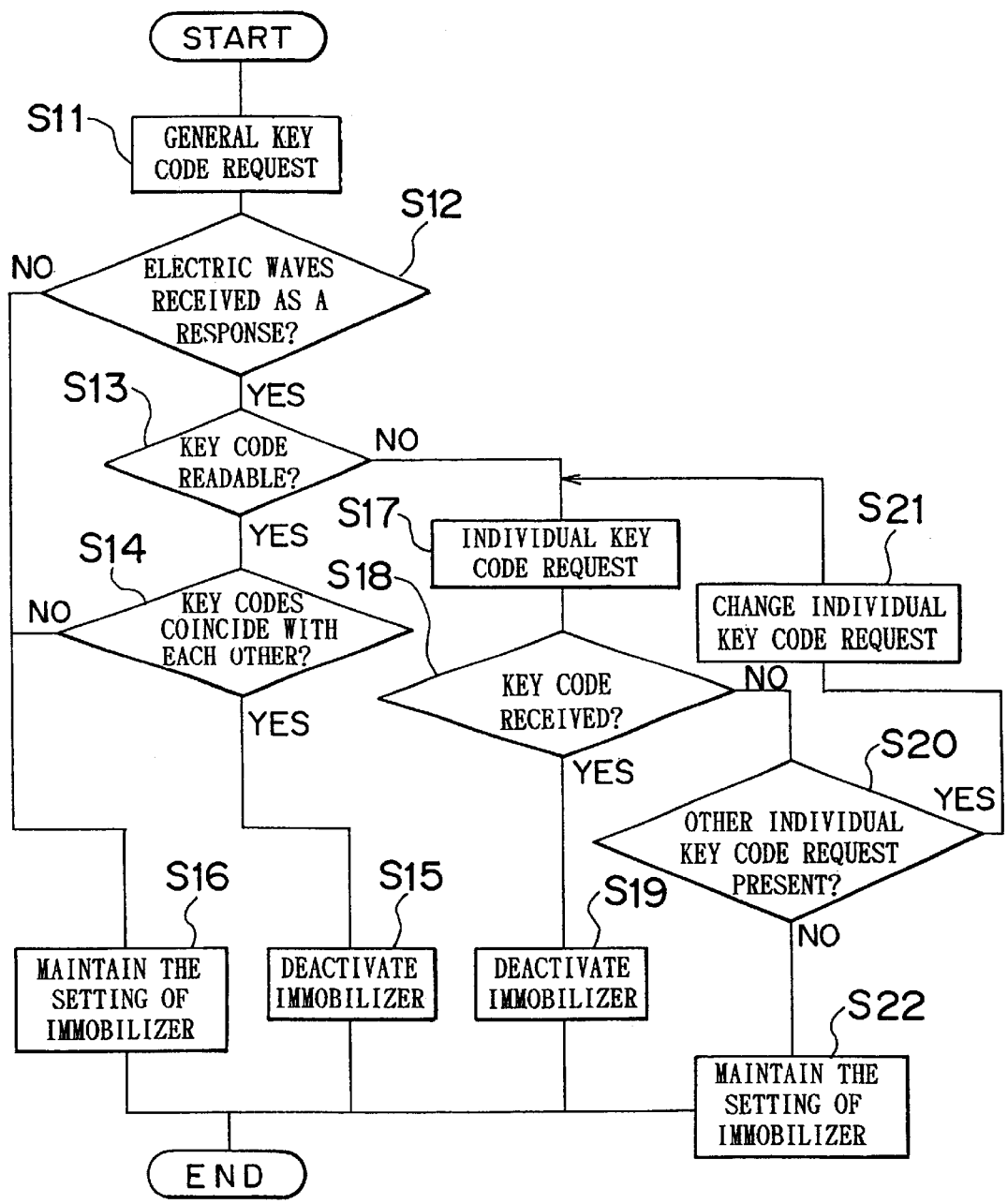
FIG. 2 is a flowchart explaining the operation of the system.

FIG. 2 is a flowchart explaining the operation of the system. If a key switch provided in a key cylinder has detected insertion of a key, the routine shown in FIG. 2 is started. First of all, the immobilizer coil 10 is supplied with electricity and a general key code request is transmitted thereto (S11). It is then determined whether or not the immobilizer coil 10 has received electric waves as a response (S12). If the result is affirmative in S12, it is determined whether or not the key code is readable (S13). If the key code is readable, it is then determined whether or not the key code coincides with any of the key codes stored in memory 16 (S14). If the result is affirmative in S14, the use of a correct key has been confirmed. Therefore, the immobilizer is deactivated (S15). In other words, the starting of the engine is permitted. On the other hand, if the result is negative in S14 and there is no coincidence between the key codes, the following conclusion can be derived. Namely, although a key has been inserted into the key cylinder and there is a response from the key, the key is not registered (the key is not an authorized one). Therefore, the immobilizer is maintained in its activated state (S16). If the result is negative in S12 and there is no response from the key, it is judged that the key inserted into the key cylinder is not the correct one. Hence, the operation proceeds to S16 and the immobilizer is maintained in its activated state.

If the result is negative in S13, the key code is not readable despite the presence of some response from the key (the reception of electric waves). Accordingly, it can be determined that responses from a plurality of keys interfere with one another. Hence, in this case, interrogator 100 changes its mode of operation to the transmission of individual key codes to which passwords are added. It is determined in advance in which sequence those passwords should be transmitted. In accordance with the set sequence, a password A is selected. Then, an individual key code to which the password A is added is transmitted from the immobilizer coil 10 (S17). It is then determined whether or not a key code registered in correspondence with the password A has been returned (S18). If the result is affirmative in S18, the use of a correct key has been confirmed. Therefore, the immobilizer is deactivated (S19).

If the result is negative in S18, it is determined whether or not there is a request for an unsent individual key code, that is, whether or not there is an unsent password (S20). If the result is affirmative, the individual key code request (password) is changed (S21), and the operation returns to the transmission in S17. If the result is negative in S20 and all the requests for selected key codes have been transmitted, it is concluded that there is no correct key. The operation is then terminated. In other words, the immobilizer is maintained in its activated state (S22).

As described above, according to the present embodiment, when there is no interference of responses, the vehicle-side device transmits a general key code request. Thus, upon receipt of the general key code request, the key returns a response, whereby quick communication is achieved. If there are interfering responses, the interference is detected, registered keys are sequentially designated, and an individual key code requests are transmitted. Accordingly, even if a plurality of keys are located within the reach of electromagnetic waves from the immobilizer coil 10, it is possible to prevent responses from interfering with one another and to thereby accomplish reliable communication.

Figure 3:
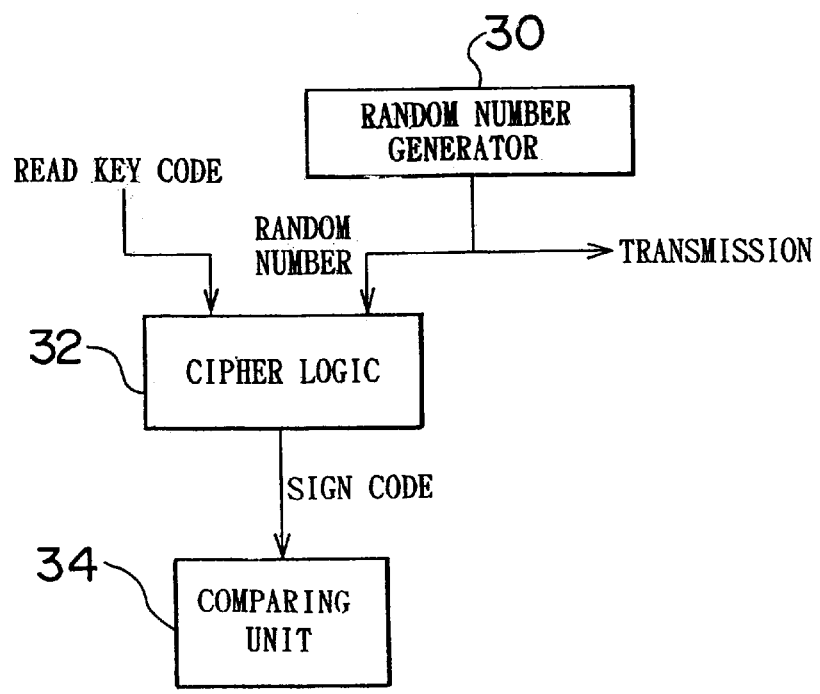
FIG. 3 is a more detailed block/schematic diagram of processor 14 of a interrogator 100.
Figure 4:
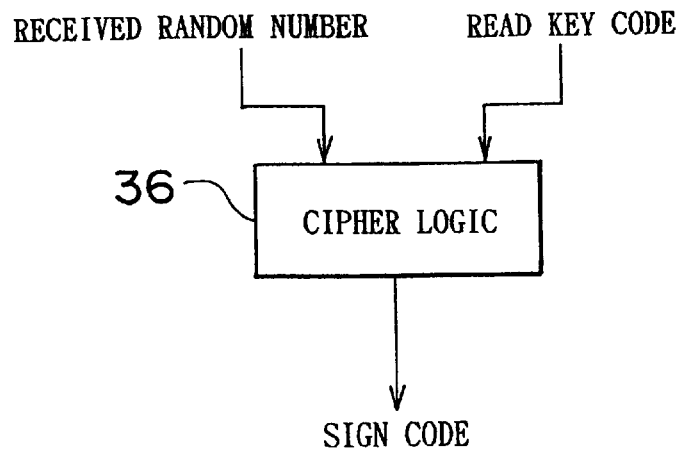
FIG. 4 is a more detailed block/schematic diagram of a processor 24 of transponder 200.

Instead of directly transmitting and receiving key codes, this embodiment of the invention also provides the ability to transmit and receive key codes with the aid of random numbers. This arrangement is explained with reference to FIG. 3. Processor 14 of the vehicle-side device is provided with a random number generator 30, a cipher logic 32 and a comparing unit 34. Further, as shown in FIG. 4, processor 24 of transponder 200 has a cipher logic 36. Cipher logic 32 and 36 are well known to those of ordinary skill in the art to which this invention pertains and will not be described in detail. Preferably, processors 14 and 24 are constructed in the form of hardware circuits. However, it is also possible to construct them in the form of software running on a microprocessor.

Random number generator 30 of interrogator 100 generates a random number according to a predetermined mode. Processor 14 causes the immobilizer coil 10 to transmit the thus-generated random number. In transponder 200, a sign code is generated by the cipher logic 36 based on the received random number and a key code read from the memory 26. The sign code is then incorporated into an answer signal and returned to interrogator 100.

The cipher logic 32 generates a reference sign code based on a key code read from the memory and a random number generated by the random number generator 30. Cipher logic 32 in interrogator 100 is a identical to cipher logic 36 in transponder 200. If the key code read from the vehicle-side device 100 coincides with the key code read from the transponder 200, the sign code generated by the cipher logic 32 coincides with the sign code generated by the cipher logic 36. Accordingly, if there is a response from a correct key, collation is successfully carried out in the comparing unit 34 of interrogator 100.

According to this method, a random number is transmitted and a sign code is returned. The random number and the sign code as data are changed every time. For this reason, it becomes difficult to decipher a key code.

Figure 5A:
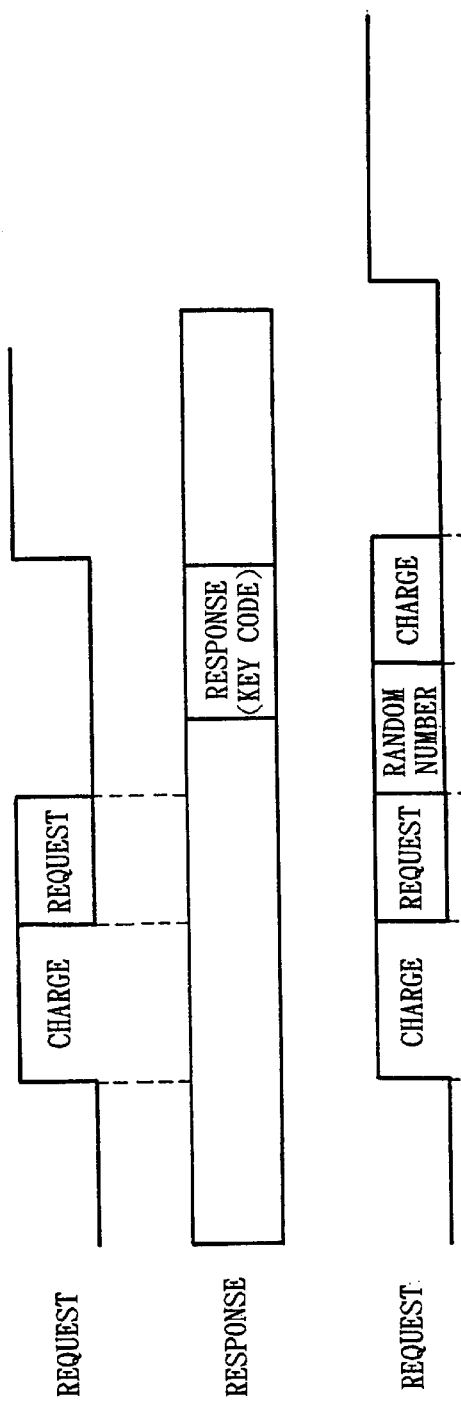
FIGS. 5A, 5B and 5C are timing diagrams explaining the various communications that occur between interrogator 100 and transponder 200.
Figure 5B:
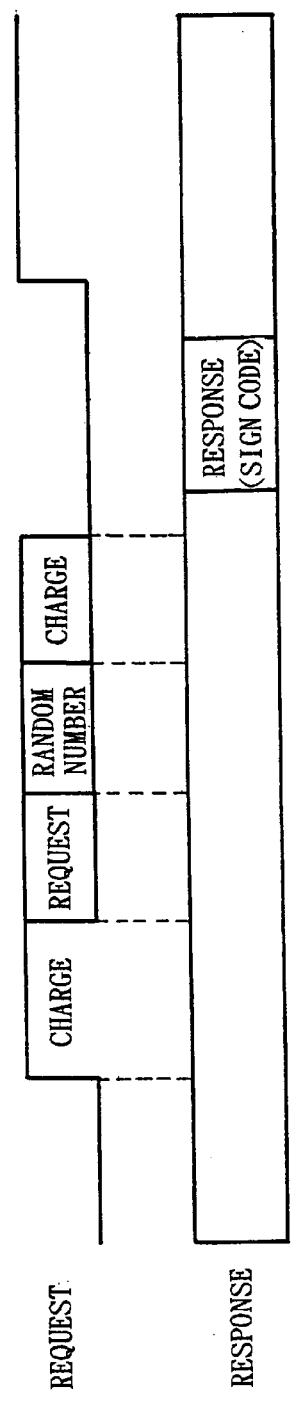
Figure 5C:
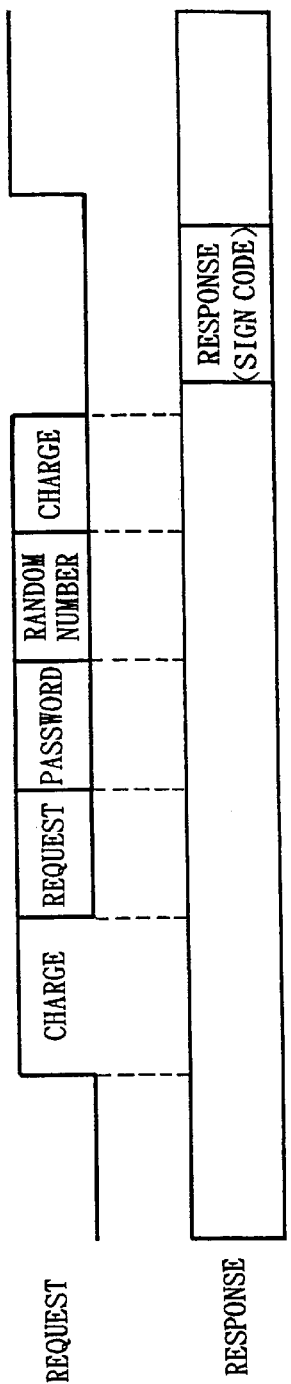

FIGS. 5A, 5B and 5C show, as an example, the timing of a key code request and a response to the request. FIG. 5A shows an example of communication where no random number is used. A request signal from the interrogator 100 is composed of electric waves for charging the transponder 200 and a key code request. In response to the key code request, the transponder 200 reads a key code stored in the memory 26 and returns a response including the key code.

As shown in FIG. 5B, interrogator 100 transmits a random number after a key code request. The transponder 200 returns a response including a sign code that is generated from the received random number and a key code read from the memory 26. After a key code request, the interrogator 100 transmits an electromagnetic signal for recharging the transponder 200.

As shown in FIG. 5C, the transmit signal transmitted from interrogator 100 includes a password for designating a transponder 200. Only the specific transponder 200 specified by the password returns a response.

It is also preferable that a user be allowed to determine whether or not a password should be incorporated into a response. For example, the incorporation of a password can be set by means of a specific operation, such as a combination of the turning on and off of an ignition switch with the turning on and off of a door switch.

Figure 6:
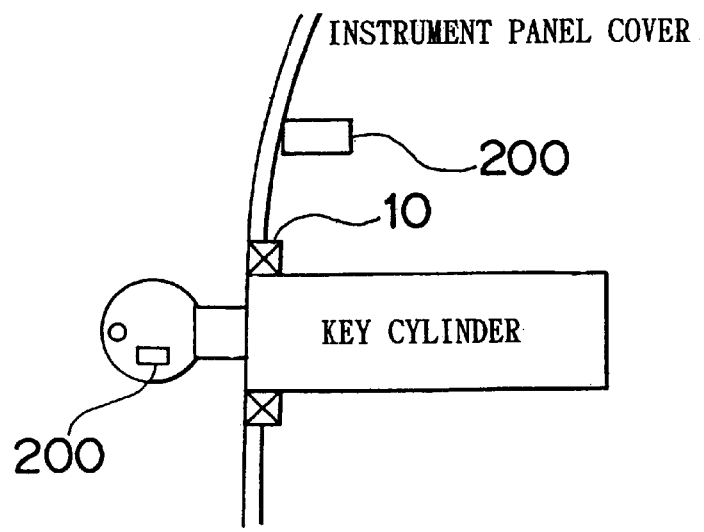
FIG. 6 is a schematic diagram showing a key and ignition switch showing the relative positions of transponder 200 and immobilizer coil 10.
Figure 7:
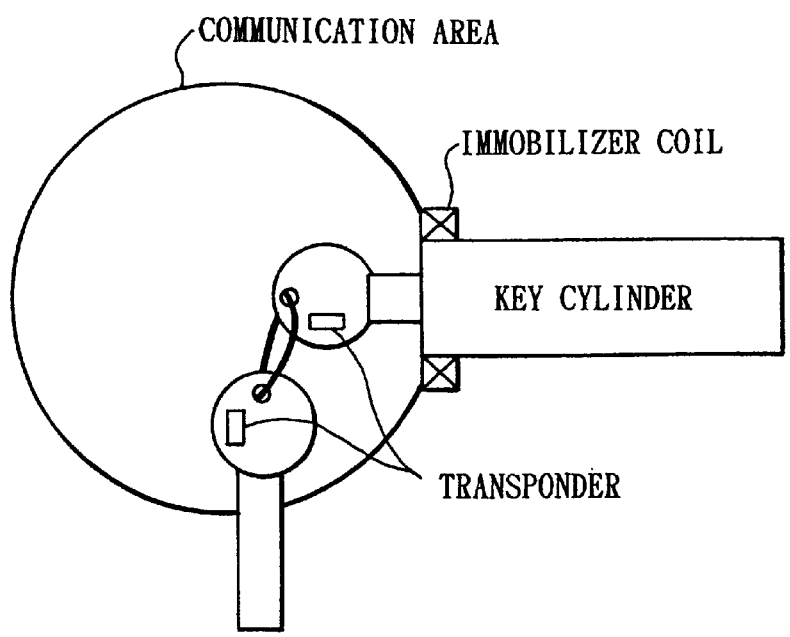
FIG. 7 is a schematic diagram showing why interference can occur.

As shown in FIG. 6, a single-piece transponder 200 is embedded on a reverse side of an instrument panel in the vicinity of the immobilizer to coil 10. Accordingly, the thus-embedded transponder 200 never fails to return a response to a key code request from the immobilizer coil 10.

When a vehicle has been left outside for a long time and there is a reasonable probability of car theft, the transmission of a transmit signal including a password is prohibited. Even if a correct key is used, a response from the embedded transponder 200 interferes with a response from the key inserted into the key cylinder. Therefore, the immobilizer is not deactivated. Accordingly, there is no possibility of the immobilizer being deactivated by means of a duplicated key or a stolen key.

Preferably, the embedded transponder is designed to respond only to a key code request as shown in FIG. 5A. If the mode of transmission is limited to what is shown in FIG. 5A by means of an operation by the user, the immobilizer can be prevented from being deactivated, as in the above-described case. In the case where the setting by the user has been released, if the transmission is carried out according to FIG. 5B, the transmission timing of the embedded transponder 200 is displaced. Hence, a return signal therefrom is ignored, and a response from a correct key is not recognized by interrogator 100. Normally, the operation is made possible using the random number and a general key code request. In this mode, if responses from a plurality of keys interfere with one another, the transition to the communication shown in FIG. 5C is made. Thereby, such interference can be obviated.

In the above-described embodiment of the present invention, when starting processing on the vehicle-side by processor 14, it is confirmed that the key has been inserted into the key cylinder. However, a key code request signal may be transmitted by pressing a switch provided either on the vehicle side or on the key side.

According to what has been described above, the immobilizer is deactivated after comparison of key codes. However, the present invention is not limited to such a case. For example, the door lock may be deactivated after comparison of key codes.

While the present invention has been described with reference to what is presently considered to be a preferred embodiment thereof, it is to be understood that the present invention is not limited to the disclosed embodiment or construction. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

The invention claimed is:

1. A key code correlation security arrangement, comprising:
    a key;
    a transponder associated with the key, the transponder having a memory for storing a predetermined key code, and means for transmitting that key code in response to a key code request transmitted thereto; and
    an interrogator for transmitting general and specific key code requests to the transponder, the interrogator having a memory for storing one or more predetermined key codes identifying authorized keys, means for receiving a key code from the transponder in response to a key code request, and means for comparing a received key code with the key codes stored in interrogator memory, the interrogator also having a key code request changing means for differentiating key code requests for a plurality of key codes, and interference determination means for determining whether or not answer signals responding to a key code request interfere with one another, and
    wherein if the interference determination means has determined that there is interference of two or more key code responses from transponders in response to a general key code request, the interrogator then transmits specific key code requests that are specific to individual keys, and compares responses received with the key codes of such specific key code requests.

2. An arrangement according to claim 1, wherein the transponder comprises a power supply that receives an electromagnetic wave from the interrogator and stores electric power therefrom for operating the transponder.

3. An arrangement according to claim 1, wherein the interrogator has a coil that transmits electromagnetic waves to the transponder and receives a response signal including a key code therefrom.

4. An arrangement according to claim 1, wherein the interference determination means has means for detecting that the transponder is ready to transmit an answer signal in response to a key code request from the interrogator.

5. An arrangement according to claim 4, further comprising means for detecting insertion of the key into a lock cylinder.

6. An arrangement according to claim 4, wherein the interference determination means determines that there is interference, if it has been detected that the key is ready to transmit an answer signal in response to a key code request from the interrogator and if a key code cannot be recognized despite reception of the answer signal responding to the key code request.

7. An arrangement according to claim 1, wherein the interference determination means determines that there is interference if a key code cannot be recognized despite reception of an answer signal responding to a key code request.

8. An arrangement according to claim 1, wherein if there is no interference and a key code has been received, the received key code is compared to a plurality of key codes previously stored in the interrogator memory according to a predetermined sequence.

9. An arrangement according to claim 1, wherein the interrogator transmits a key code request including a cipher signal, and wherein the transponder returns a ciphered key code in response to the ciphering signal.

10. An arrangement according to claim 1, wherein a key code request from the interrogator comprises a password, and wherein the transponder returns a key code if the key has a password identical to the transmitted password.

11. A key code authorization method, comprising the steps of:
    storing a plurality of correlation key codes in an interrogator;
    transmitting by the interrogator a key code request;
    receiving by a transponder associated with a key the key code request transmitted by the interrogator;
    transmitting by the transponder a key code allocated to its associated key; and
    receiving by the interrogator the key code transmitted by the transponder;
    if it has been determined by the interrogator that there are two or more answer signals responding to the key code request that interfere with one another, transmitting by the interrogator key code requests for specific keys, and comparing received key codes with key codes previously stored in the interrogator.

12. A method according to claim 11, wherein if it has been determined by the interrogator that answer signals responding to a key code request do not interfere with one another, a received key code is compared with key codes stored in the interrogator according to a predetermined sequence.

13. A method according to claim 11, further comprising the step of determining that there is interference if a key code received by the interrogator cannot be recognized despite reception of an answer signal responding to a key code request.

14. A method according to claim 11, further comprising the step of determining that there is interference, if it has been detected that the transponder is ready to transmit an answer signal in response to a key code request from the interrogator and if a key code cannot be recognized despite reception of the answer signal responding to the key code request.

* * * * *